(12) United States Patent
Wei et al.

(10) Patent No.: US 10,440,687 B2
(45) Date of Patent: Oct. 8, 2019

(54) METHOD AND USER EQUIPMENT FOR RESOURCE ALLOCATION OF VEHICLE NETWORK

(71) Applicant: Industrial Technology Research Institute, Hsinchu (TW)

(72) Inventors: Chun-Yi Wei, New Taipei (TW); Chorng-Ren Sheu, Kaohsiung (TW); Hua-Lung Tsai, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/847,923

(22) Filed: Dec. 20, 2017

(65) Prior Publication Data

US 2019/0053194 A1 Feb. 14, 2019

Related U.S. Application Data

(60) Provisional application No. 62/543,396, filed on Aug. 10, 2017.

(51) Int. Cl.
*H04W 4/00* (2018.01)
*H04W 72/04* (2009.01)
(Continued)

(52) U.S. Cl.
CPC .......... *H04W 72/04* (2013.01); *H04B 17/318* (2015.01); *H04W 4/46* (2018.02)

(58) Field of Classification Search
None
See application file for complete search history.

(56) References Cited

U.S. PATENT DOCUMENTS

| 5,548,809 A | 8/1996 | Lemson |
| 9,398,599 B2 | 7/2016 | Kremo et al. |

(Continued)

FOREIGN PATENT DOCUMENTS

| TW | 201714461 | 4/2017 |
| WO | 2014052341 | 4/2014 |

(Continued)

OTHER PUBLICATIONS

"Office Action of Taiwan Counterpart Application" , dated Oct. 9, 2018, p. 1-p. 12.

(Continued)

*Primary Examiner* — Anh Vu H Ly
(74) *Attorney, Agent, or Firm* — JCIPRNET

(57) ABSTRACT

A method and a user equipment for resource allocation of vehicle network are provided. The method includes: sensing available resource blocks (RBs) to generate a first resource indicator labeling location information of the available RBs; receiving second resource indicators from neighboring devices in which the second resource indicators label location information of the available RBs sensed by the neighboring devices; combining the first resource indicator and the second resource indicators into a cooperative resource indicator and sending the cooperative resource indicator to a base station providing a centralized network; and receiving location information of a dedicated RB assigned by the base station according to the cooperative resource indicator and sending messages via the dedicated RB.

32 Claims, 14 Drawing Sheets

(51) Int. Cl.
*H04B 17/318* (2015.01)
*H04W 4/46* (2018.01)

(56) References Cited

U.S. PATENT DOCUMENTS

| | | | |
|---|---|---|---|
| 2010/0311450 A1 | 12/2010 | Rinne et al. | |
| 2013/0039203 A1* | 2/2013 | Fong | H04B 7/024 370/252 |
| 2016/0007208 A1 | 1/2016 | Yang et al. | |
| 2016/0025635 A1 | 1/2016 | Li et al. | |
| 2016/0295589 A1* | 10/2016 | Nikopour | H04W 4/023 370/328 |
| 2016/0295624 A1 | 10/2016 | Novlan et al. | |
| 2016/0338056 A1* | 11/2016 | Xue | H04W 48/16 370/329 |
| 2016/0338122 A1 | 11/2016 | Tsai et al. | |
| 2017/0079059 A1* | 3/2017 | Li | H04W 16/02 370/328 |
| 2017/0085356 A1* | 3/2017 | Lin | H04L 5/023 370/329 |
| 2017/0086028 A1* | 3/2017 | Hwang | H04W 4/027 370/328 |
| 2017/0188391 A1 | 6/2017 | Rajagopal et al. | |
| 2017/0238292 A1* | 8/2017 | Rico Alvarino | H04L 5/0048 370/329 |
| 2017/0332352 A1* | 11/2017 | Sheng | H04L 67/12 370/328 |
| 2018/0020387 A1* | 1/2018 | Van Der Velde | H04W 36/0072 370/328 |
| 2018/0042023 A1* | 2/2018 | Sheng | H04W 4/046 370/328 |
| 2018/0092065 A1* | 3/2018 | Sheng | H04W 74/006 370/328 |
| 2018/0124707 A1* | 5/2018 | Lee | H04W 52/10 370/328 |
| 2018/0176891 A1* | 6/2018 | Kim | H04L 5/0037 370/328 |
| 2018/0199174 A1* | 7/2018 | Gozalvez-Serrano | H04W 72/121 370/328 |
| 2018/0213549 A1* | 7/2018 | Kim | H04L 1/00 370/328 |
| 2018/0242190 A1* | 8/2018 | Khoryaev | H04W 28/0284 370/328 |
| 2018/0343587 A1* | 11/2018 | Condeixa | H04W 28/26 370/328 |
| 2019/0116586 A1* | 4/2019 | Basu Mallick | |

FOREIGN PATENT DOCUMENTS

| | | |
|---|---|---|
| WO | 2015158251 | 10/2015 |
| WO | 2016119502 | 8/2016 |
| WO | 2017011106 | 1/2017 |
| WO | 2017052690 | 3/2017 |

OTHER PUBLICATIONS

Bengi Aygun et al., "A Voting-Based Distributed Cooperative Spectrum Sensing Strategy for Connected Vehicles", IEEE Transactions on Vehicular Technology, Jun. 2017, pp. 5109-5121.
Ahmed A. Ahmed et al., "Cooperative Spectrum Sensing for Cognitive Radio Vehicular Ad Hoc Networks: An Overview and Open Research Issues", IEEE Canadian Conference on Electrical and Computer Engineering (CCECE), May 2016, pp. 1-4.
A. Al Hammadi et al., "Centralized Cooperative Spectrum Sensing with Multiple Antennas Over Imperfect Feedback Channels", 2014 International Conference on Connected Vehicles and Expo (ICCVE), Nov. 2014, pp. 529-533.
Siting Zhu et al., "User Correlation and Double Threshold Based Cooperative Spectrum Sensing in Dense Cognitive Vehicular Networks", IEEE Transactions on Vehicular Technology, Sep. 2016, pp. 281-285.
Raouf Abozariba et al., "Radio Resource Sharing Framework for Cooperative Multioperator Networks With Dynamic Overflow Modeling", IEEE Transactions on Vehicular Technology, Mar. 2017, pp. 2433-2447.
Chunbo Luo et al., "A Communication Model to Decouple the Path Planning and Connectivity Optimization and Support Cooperative Sensing", IEEE Transactions on Vehicular Technology, Oct. 2014, pp. 3985-3997.
Huawei, et al., "Mode 2 Resource Allocation for D2D" 3GPP, vol. TSG RAN WG1, Aug. 18, 2014, pp. 1-6.
Huawei, et al., "Collision Avoidance for Mode 2" 3GPP, vol. TSG RAN WG1, Nov. 15, 2015, pp. 1-6.
Ericsson, "Sidelink Resource Allocation in V2X" 3GPP, vol. TSG RAN WG2, Feb. 14, 2016, pp. 1-10.
"Search Report of Europe Counterpart Application", dated Jul. 18, 2018, p. 1-p. 10.

* cited by examiner

METHOD AND USER EQUIPMENT FOR RESOURCE ALLOCATION OF VEHICLE NETWORK

CROSS-REFERENCE TO RELATED APPLICATION

This application claims the priority benefit of U.S. application Ser. No. 62/543,396, filed on Aug. 10, 2017. The entirety of the above-mentioned patent application is hereby incorporated by reference herein and made a part of this specification.

TECHNICAL FIELD

The disclosure relates to a method and a user equipment (UE) for resource allocation of vehicle network.

BACKGROUND

With the evolution of autopilot technology, a Vehicle Network has been established for enhancing communications in between vehicle to vehicle (V2V), vehicle to pedestrian (V2P) and vehicle to infrastructure (V2I). Said communications include a direct communication via a distributed network and a communication via a centralized network centered on a base station. A vehicle network technology can provide a variety of functions including nearby vehicle movement, obstacle reminder, collision warning, etc., which can improve safety in autopilot driving or manual driving.

FIG. 1 is a schematic diagram of a conventional cellar vehicle network. With reference to FIG. 1, in a vehicle network 100, vehicles 12a, 12b and 12c are located within a centralized network 120 established by a base station 12 and managed and controlled by the base station 12 to realize a communication with each other by utilizing resource blocks (RBs) assigned by the base station 12. Vehicles 14a, 14b and 14c form an independent distributed network 140 outside the centralized network 120, in which each of the vehicles 14a, 14b and 14c can independently sense available resource blocks nearby to conduct the direction communication with the other vehicles. Among them, the vehicles 12a, 12b and 12c are defined as user equipments in mode 3, whereas the vehicles 14a, 14b and 14c are defined as user equipments in mode 4.

As being located at edge of a communication range of the base station 12, if the vehicles 12a, 12b and 12c therein can share the RBs with the vehicles 14a, 14b and 14c, a spectrum utility rate may be improved. Therefore, it is required to properly manage the RBs at edge regions.

SUMMARY

The disclosure provides a method for resource allocation of vehicle network, which is adapted to a user equipment (UE) supporting a centralized network. The method includes: sensing available resource blocks (RBs) to generate a first resource indicator labeling location information of the available RBs; receiving a second resource indicator sent by each of at least one neighboring device, wherein the second resource indicator labels location information of available RBs sensed by each neighboring device; combining the first resource indicator and the second resource indicators into a cooperative resource indicator; sending the cooperative resource indicator to a base station providing the centralized network and receiving location information of a dedicated RB assigned by the base station according to the cooperative resource indicator; and sending messages via the dedicated RB.

The disclosure provides a user equipment supporting a centralized network, which includes a communication module, a storage device and a processor. Among them, the communication module is configured to communicate with a base station and UEs nearby. The storage device is configured to store a plurality of commands. The processor is coupled to the communication module and the storage device, and configured to load and execute the commands stored in the storage device for: sensing available resource blocks (RBs) to generate a first resource indicator labeling location information of the available RBs; receiving a second resource indicator sent by each of at least one neighboring device by utilizing the communication module, wherein the second resource indicator labels location information of available RBs sensed by each neighboring device; combining the first resource indicator and the second resource indicators into a cooperative resource indicator and sending the cooperative resource indicator to a base station providing a centralized network by utilizing the communication module; and receiving location information of a dedicated RB assigned by the base station according to the cooperative resource indicator and sending messages via the dedicated RB by utilizing the communication module.

The disclosure provides a method for resource allocation of vehicle network, which is adapted to a user equipment (UE) supporting a distributed network. The method includes steps of: sensing available resource blocks (RBs) to generate a first resource indicator labeling location information of the available RBs; receiving a second resource indicator sent by each of at least one neighboring device, wherein the second resource indicator labels location information of available RBs sensed by each neighboring device; combining the first resource indicator and the second resource indicators into a cooperative resource indicator; and selecting a dedicated RB according to the cooperative resource indicator and sending messages via the dedicated RB.

The disclosure provides a user equipment supporting a distributed network, which includes a communication module, a storage device and a processor. Among them, the communication module is configured to communicate with UEs nearby. The storage device is configured to store a plurality of commands. The processor is coupled to the communication module and the storage device, and configured to load and execute the commands stored in the storage device for: sensing available resource blocks (RBs) to generate a first resource indicator labeling location information of the available RBs; receiving a second resource indicator sent by each of at least one neighboring device by utilizing the communication module, wherein the second resource indicator labels location information of available RBs sensed by each neighboring device; combining the first resource indicator and the second resource indicators into a cooperative resource indicator; and selecting a dedicated RB according to the cooperative resource indicator and sending messages via the dedicated RBs by utilizing the communication module.

To make the above features of the disclosure more comprehensible, several embodiments accompanied with drawings are described in detail as follows.

DESCRIPTION OF EMBODIMENTS

In order to increase the spectrum utility rate, the embodiments of the disclosure provide a method for resource allocation of vehicle network, which is applicable to user equipments (UEs) in different modes (i.e., in mode 3 and mode 4) at edge of the cellular network for allowing the UEs to share the resource pools with each other. That is to say, the UEs at edge of the cellular network can share resource blocks (RBs) in order to improve bandwidth efficiency.

Figure 1:
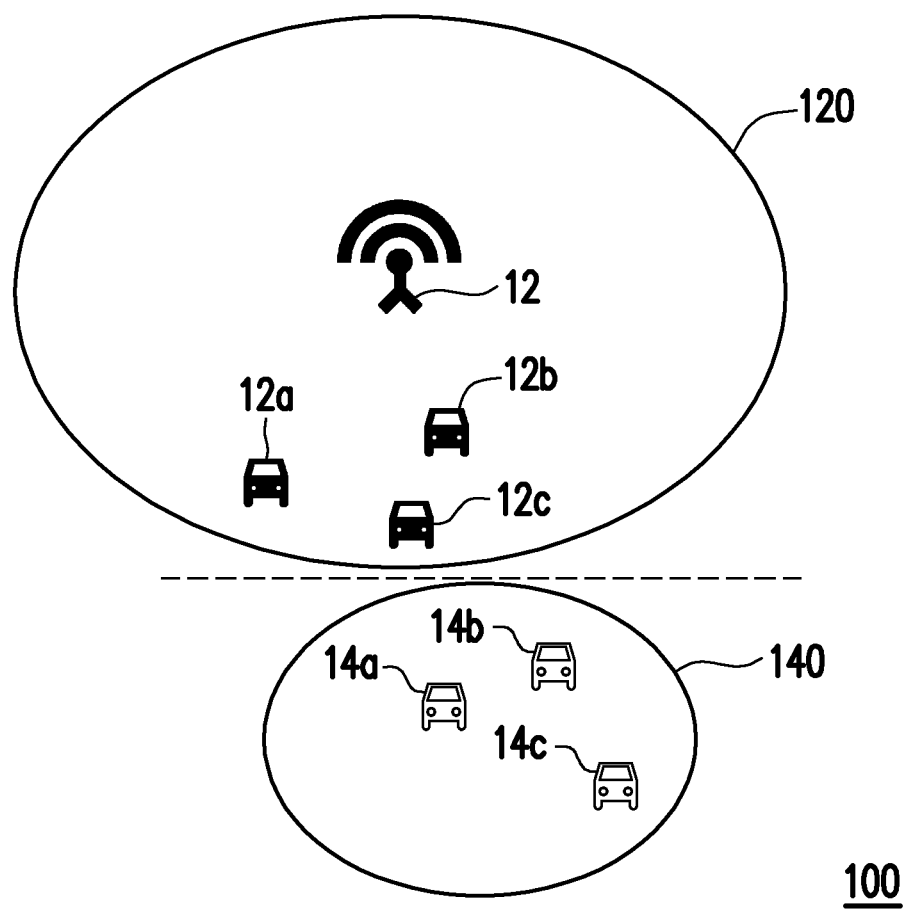
FIG. 1 is a schematic diagram of a conventional cellar vehicle network.
Figure 2A:
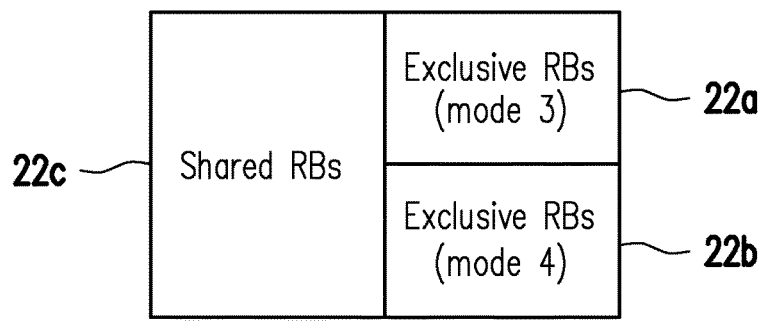
FIG. 2A and FIG. 2B are schematic diagrams illustrating configuration of resource pool according to an embodiment of the disclosure.
Figure 2B:
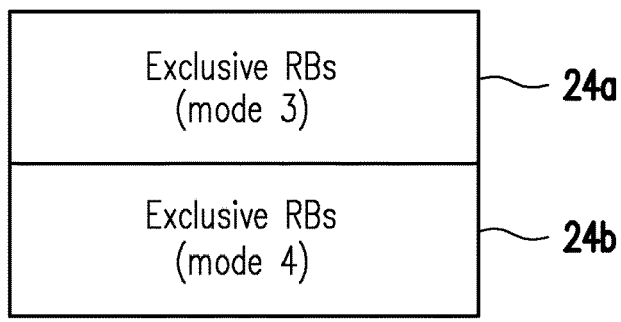

For instance, FIG. 2A and FIG. 2B are schematic diagrams illustrating configuration of resource pool according to an embodiment of the disclosure. In FIG. 2A, the UEs in mode 3 and mode 4 are configured with exclusive RBs 22a and 22b. Specifically, the exclusive RBs 22a can only be used by the UEs in mode 3, and the exclusive RBs 22b can only be used by the UEs in mode 4. Shared RBs 22c are provided for both the UEs in mode 3 and mode 4 to use. In an embodiment, the shared RBs 22c are, for example, a part of RBs divided from a plurality of RBs provided for the UEs in mode 4 to use, and allows the UEs in mode 3 to use the shared RBs 22c in addition to the exclusive RBs 22a thereby increasing available resource.

On the other hand, in FIG. 2B, the UEs in mode 3 and mode 4 are respectively configured with exclusive RBs (24a, 24b), and yet, when the exclusive RBs (24a, 24b) of the UEs in mode 3 or mode 4 are fully occupied, the exclusive RBs (24a, 24b) of the other side which are not occupied or have lower utility rate may be used.

Figure 3:
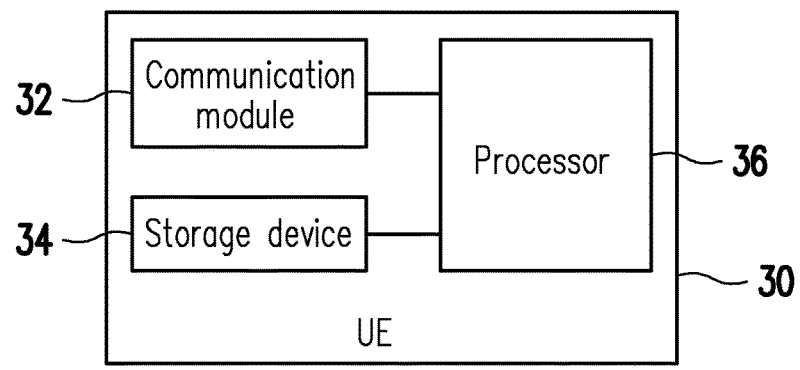
FIG. 3 is a block diagram illustrating a user equipment according to an embodiment of the disclosure.

FIG. 3 is a block diagram illustrating a user equipment according to an embodiment of the disclosure. With reference to FIG. 3, a UE 30 of the present embodiment is, for example, a driver computer equipped with advanced driver assistance systems (ADAS) and supporting the vehicle network technology, or a computing device such as a server, a personal computer (PC), a tablet computer, a mobile phone, a personal digital assistant (PDA), etc. The UE 30 includes, for example, a communication module 32, a storage device 34 and a processor 36, and their functions are described as follows.

The communication module 32 is, for example, a communication device that supports long term evolution (LTE) (i.e., 4G) technology with frequency band of 2 GHz and/or dedicated short-range communication (DSRC) technology with frequency band of 5.9 GHz. In an embodiment, the communication module 32 can utilize the LTE technology to connect a base station, so as to be connected with other UEs through a centralized network established by the base station. In another embodiment, the communication module 32 may also utilize the DSRC technology to form a distributed network together with UEs nearby, so as to perform a direction communication with the UEs nearby. In the following embodiments, the UEs supporting the centralized network are also referred to as the UEs in mode 3, and the UEs supporting the distributed network are also referred to as the UEs in mode 4.

The storage device 34 may be a random access memory (RAM), a read-only memory (ROM), a flash memory or other similar components in any fixed or portable forms, or a combination of the above components. In the present embodiment, the storage device 34 is configured to store data received by the communication module 32 and record computer commands or programs accessible and executable by the processor 36.

The processor 36 is, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processor 36 is connected to the communication module 32 and the storage device 34, and is able to load the commands from the storage device 34 for executing the method for resource allocation of vehicle network of the disclosure. Various embodiments are provided below and served to describe detailed step of said method.

Figure 4:
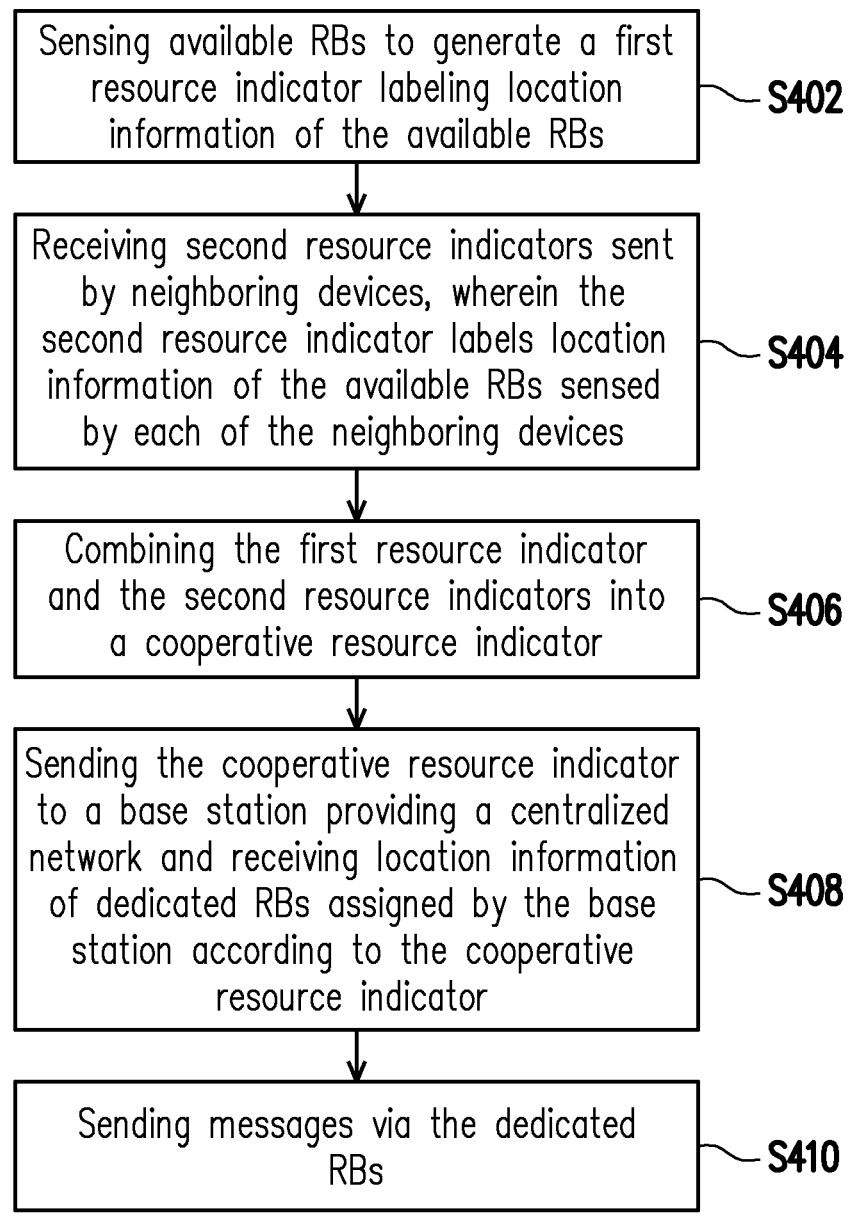
FIG. 4 is a flowchart illustrating a method for resource allocation of vehicle network according to an embodiment of the disclosure.

FIG. 4 is a flowchart illustrating a method for resource allocation of vehicle network according to an embodiment of the disclosure. Referring to FIG. 3 and FIG. 4 together, the method of the present embodiment is adapted to a UE supporting a centralized network (e.g., the UE 30 in FIG. 3), and detailed steps of the method for resource allocation of vehicle network are described below with reference to various components in the UE 30.

In step S402, the processor 36 senses available RBs from all RBs to generate a first resource indicator labeling location information of the available RBs. Here, the processor 36 periodically performs a spectrum sensing for all the RBs according to, for example, a predetermined time interval (e.g., 20 ms, 40 ms, . . . , or 10240 ms) to obtain a received signal strength indicator (RSSI) of each of the RBs, determines whether the RSSI of each of the RBs is greater than a preset threshold, and uses the RBs with the RSSI not greater than the threshold as the available RBs.

In addition, the processor 36 quantizes signal energy of all the RBs according to the sensed location information of the available RBs to generate a binary sequence serving as the first resource indicator. For instance, the processor 36 may record locations of the available RBs (i.e., with the measured RSSI not greater than the threshold) among all the RBs as 0 and record locations of occupied RBs (i.e., with the RSSI greater than the threshold) as 1 such that the binary sequence representing all the RBs may then be formed by collecting binary values of all the RBs.

In step S404, the processor 36 receives a second resource indicator sent by at least one neighboring device via the communication module 32. The neighboring device is, for example, the UE in mode 3 or mode 4. As similar to the UE 30, each of the neighboring devices is capable of sensing available RBs from all the RBs, and configured to generate the second resource indicator labeling the location information of the available RBs. The neighboring device, for example, broadcasts sidelink control information (SCI) via a physical sidelink control channel (PSCCH) and has the second resource indicator included in the SCI. Accordingly, the processor 36 can obtain the second resource indicator of the neighboring device from the SCI received via the PSCCH.

In step S406, the processor 36 combines the first resource indicator and the second resource indicators into a cooperative resource indicator. Here, the processor 36 calculates an average, an intersection (i.e., a logic AND operation) or a majority decision of binary sequence quantized values of locations of the RBs labeled in the first resource indicator and the second resource indicators to generate the binary sequence serving as the cooperative resource indicator, wherein the locations of the available RBs may be labeled by 0 while the locations of the rest of the RBs are labeled by 1, and the implementation regarding the same will be described in more details later with reference to more embodiments. It should be noted that, when the UE 30 senses the available RBs, a sensing result can show a deviation due to interference factors such as noise caused by changes in the surrounding environment, multi-path attenuation, Doppler and shadowing effects. In that case, by combining the sensing results from multiple UEs nearby, a more reliable measuring result can be obtained.

In step S408, the processor 36 sends the cooperative resource indicator to the base station providing the centralized network via a physical uplink control channel (PUCCH) and receives location information of one or several dedicated RBs assigned by the base station according to the cooperative resource indicator via a physical downlink control channel (PDCCH) by utilizing the communication module 32. Lastly, in step S410, according to the location information of the dedicated RBs assigned by the base station, the processor 36 sends messages via the dedicated RBs by utilizing the communication module 32.

It should be noted that, the RBs used by the UE 30 supporting the centralized network during communication is assigned by the base station. In the present embodiment, the base station assigns the RBs according to the cooperative resource indicator that is combined from the sensing results of the UEs nearby and reported by the UE 30. In this way, it can be ensured that the assigned RBs are indeed the RBs not used by the other UEs or having lower utility rate so the purpose of improving the spectrum utility rate may be achieved.

On the other hand, in an embodiment, the processor 36 further receives, for example, a semi persistent scheduling (SPS) period assigned by the base station and a period and a time offset of the dedicated RBs and periodically sends the messages via the dedicated RBs within the SPS period by utilizing the communication module 32. Here, the SPS period is determined by the base station according to a semi persistent period of the location information of the available RBs in the received cooperative resource indicator. The period of the dedicated RBs is determined by the base station according to a high layer pre-configuration value. The time offset of the dedicated RB is determined by the base station according to a no-conflict principle for the dedicated RBs of each of the UEs.

In detail, the base station, for example, continuously receives a plurality of cooperative resource indicators sent by the UE 30, uses one of the cooperative resource indicators (e.g., a first cooperative resource indicator) as a reference cooperative resource indicator, uses the reference cooperative resource indicator to perform a logic operation of exclusive-OR (i.e., XOR) with the other cooperative resource indicators, and compares an average of operating results with the preset threshold in order to estimate the SPS period.

Figure 5A:
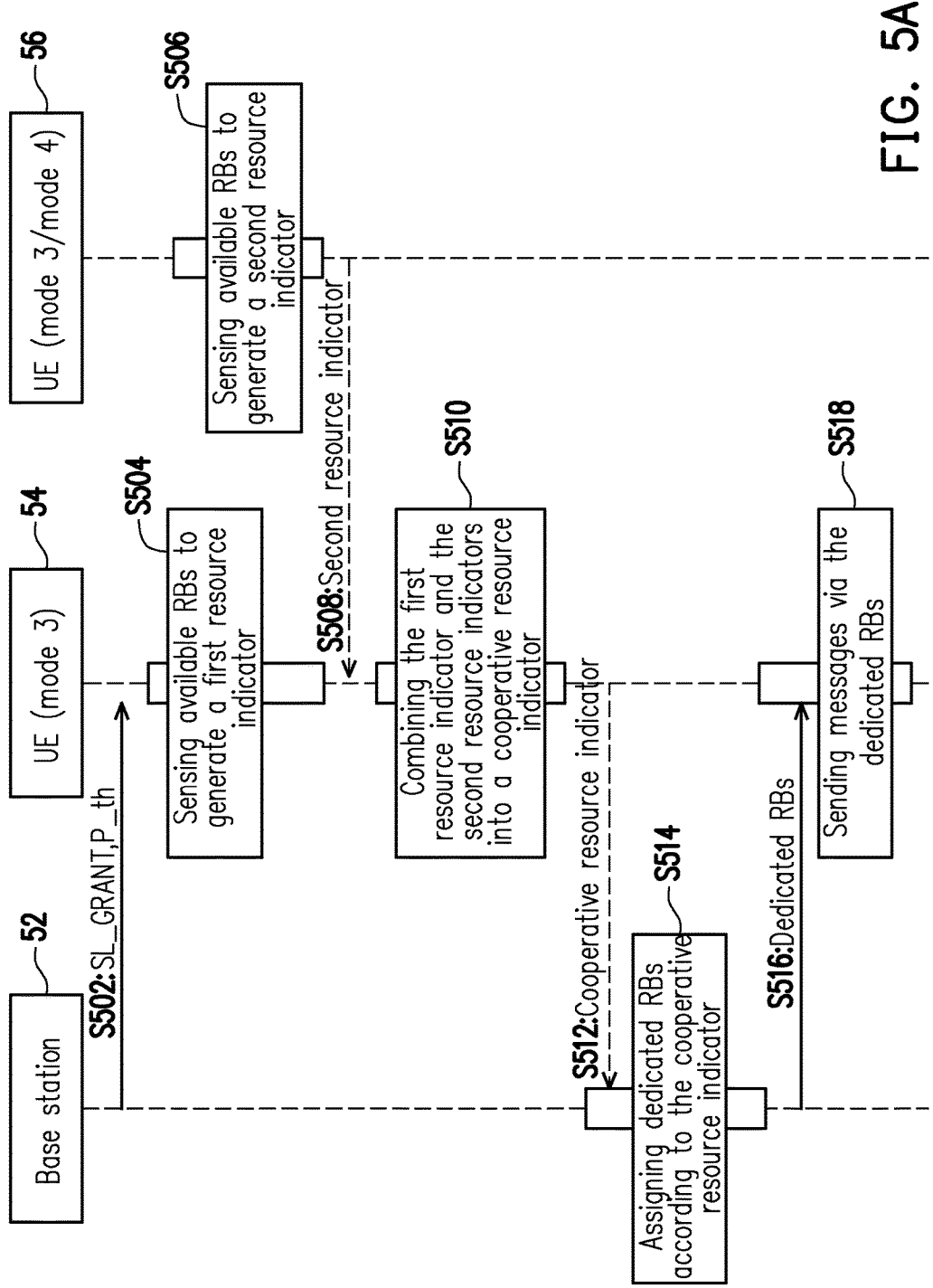
FIG. 5A and FIG. 5B are respectively a flowchart and an example illustrating a method for resource allocation of vehicle network adapted to the user equipment in mode 3 according to an embodiment of the disclosure.
Figure 5B:
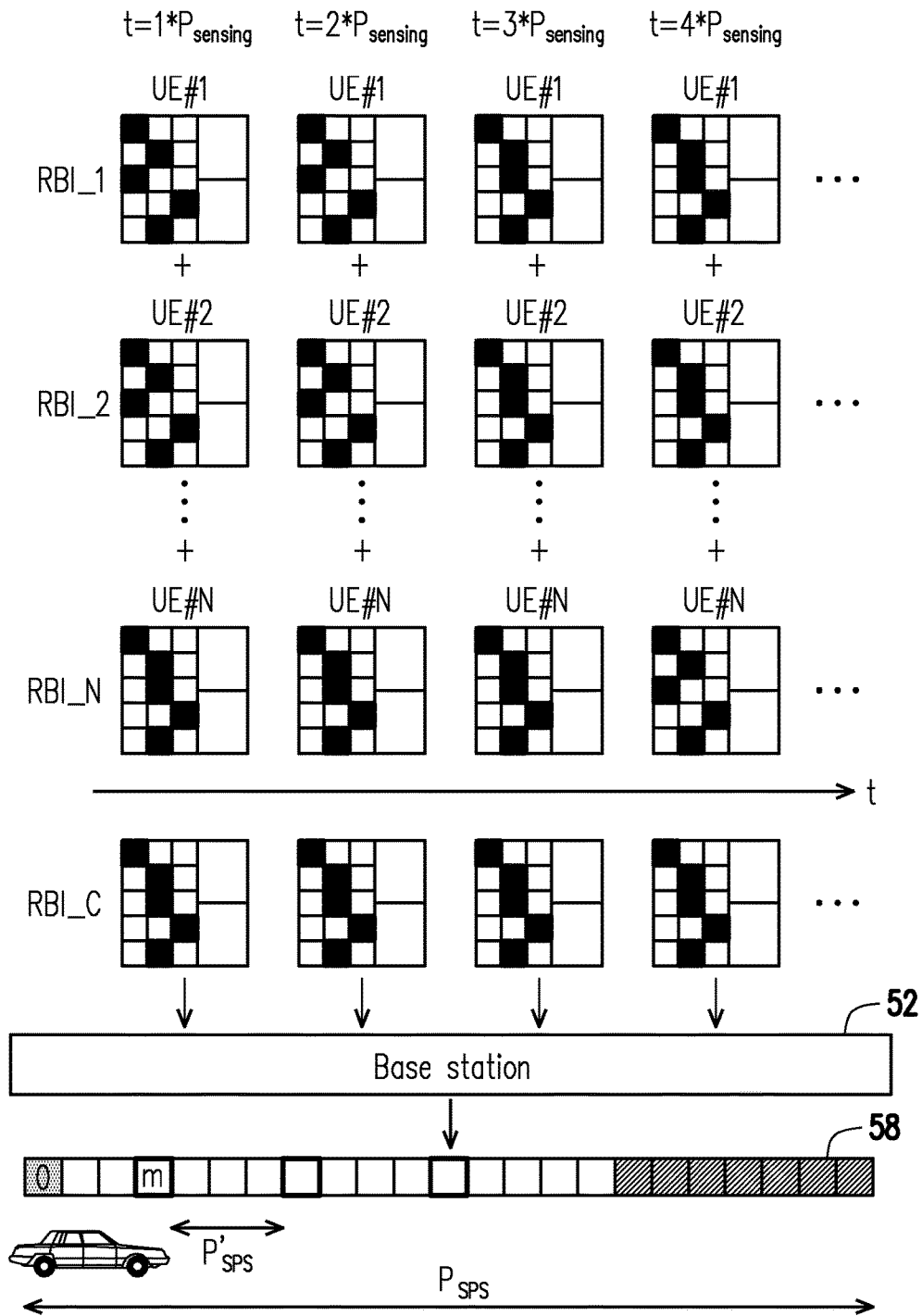

For instance, FIG. 5A and FIG. 5B are respectively a flowchart and an example illustrating a method for resource allocation of vehicle network adapted to the user equipment in mode 3 according to an embodiment of the disclosure. With reference to FIG. 5A, the method for resource allocation of vehicle network of the present embodiment is implemented by combining a base station 52, a UE (mode 3) 54 and neighboring UEs 56 (which may be in mode 3 or mode 4). In the present embodiment, UEs in mode 3 and mode 4 are respectively configured with exclusive RBs and there are shared RBs for the UEs in mode 3 and mode 4 to use (i.e., the configuration shown in FIG. 2A).

In step S502, the UE 54 receives a transmission granted signaling SL_GRANT and a preset threshold P_th sent by the base station 52. In step S504, the UE 54 senses available RBs from all the shared RB according to the threshold P_th to generate a first resource indicator. Here, the UE 54 performs, for example, a spectrum sensing for the shared RBs to obtain a RSSI of each of the RBs in the shared RBs, and then uses the RBs with the RSSI not greater than the threshold P_th as the available RBs.

In step S506, each UE 56 senses location information of the available RBs from the shared RBs to generate a second resource indicator. Here, the UE 56 senses the location information of the available RBs by using similar method used by the UE 54 and thus details regarding the same are not repeated hereinafter.

In step 508, the UE 54 receives the second resource indicators sent by the neighboring UEs 56. Here, the UE 54 receives sidelink control information (SCI) broadcasted by the UEs 56 via a physical sidelink control channel (PSCCH), and obtains the second resource indicators from the SCI.

In step S510, the UE 54 combines the first resource indicator and the second resource indicators into a cooperative resource indicator. Here, the UE 54 calculates, for example, an average, an intersection or a majority decision of binary sequence quantized values of locations of the RBs labeled in the first resource indicator and the second resource indicators to generate a binary sequence serving as the cooperative resource indicator, but the disclosure is not limited thereto. Here, the locations of the available RBs of the cooperative resource indicator may be labeled by 0 while the locations of the rest of the RBs are labeled by 1.

In step S512, the UE 54 sends the cooperative resource indicator to the base station 52 providing the centralized network via a physical uplink control channel (PUCCH).

In step S514, the base station 52 assigns one or several dedicated RBs according to the received cooperative resource indicator, and in step S516, the base station 52 sends the assigned dedicated RBs to the UE 54 via a physical downlink control channel (PDCCH).

Lastly, in step S518, according to the location information of the dedicated RBs assigned by the base station 52, the UE 54 sends messages via the dedicated RBs.

In an embodiment, with aforesaid method, the UE 54 may periodically sense the available RBs from the shared RBs, and combine to generate the cooperative resource indicator to be sent to the base station 52. The base station 52 may determine a specific SPS period according to a semi persistent period of each of the binary sequence quantized values of locations of the RBs in the cooperative resource indicators continuously generated according to a plurality of predetermined time intervals and sent by the UE 54, and instruct the UE 54 to send the messages according to information including the specific SPS period and the period and the time offset of the dedicated RBs. Here, the period of the dedicated RBs is determined by the base station according to a high layer pre-configuration value. The time offset of the dedicated RBs is determined by the base station according to the no conflict principle of the dedicated RBs of each of the UEs.

With reference to FIG. 5B, at a time $t=1*P_{sensing}$, a UE UE#1 (mode 3) senses location information of available RBs from the shared RBs and accordingly generates a first resource indicator RBI_1. Meanwhile, neighboring UEs UE#2 to UE#N (mode 3/mode 4) of the UE UE#1 also respectively sense the location information of the available RBs from the shared RBs and accordingly generate second resource indicators RBI_2 to RBI_N. The UE UE#1 receives the second resource indicators RBI_2 to RBI_N from the neighboring UEs UE#2 to UE#N, combines the same with the first resource indicator RBI_1 into a cooperative resource indicator RBI_C, and sends the cooperative resource indicator RBI_C to the base station 52. As shown in FIG. 5B, at times $t=2*P_{sensing}$, $3*P_{sensing}$ and $4*P_{sensing}$, the UEs UE#1 to UE#N continuously sense the location information of the available RBs from the shared RBs and accordingly generate the first resource indicator RBI_1 and the second resource indicators RBI_2 to RBI_N, and then the UE UE#1 combines the first resource indicator RBI_1 and the second resource indicators RBI_2 to RBI_N into the cooperative resource indicator RBI_C and provides the same to the base station 52. According to the semi persistent period of the binary sequence quantized values of locations of the RBs in the cooperative resource indicators RBI_C continuously generated according to the predetermined time intervals, the base station 52 determines a SPS period Psps and sends the same to the UE UE#1. The UE UE#1 divides, for example, the SPS period $P_{SPS}$ into smaller periods $P'_{SPS}$ of the dedicated RBs such that the messages may be sent according to information including the SPS period $P_{SPS}$, the periods $P'_{SPS}$ of the dedicated RBs and a time offset in of the dedicated RBs. Taking FIG. 5B for example, if a length of the SPS period $P_{SPS}$ provided by the base station 52 (e.g., a scheduling period length 58 shown in the drawing) is 10240 ms, the UE UE#1 (e.g., a vehicle shown in the drawing) may divide such length into the smaller periods $P'_{SPS}$, and send the messages by the periods $P'_{SPS}$ starting from a time point m. In this way, bandwidth utility rate may be improved without increasing additional signaling redundancy and additional message decoding complexity.

Figure 6A:
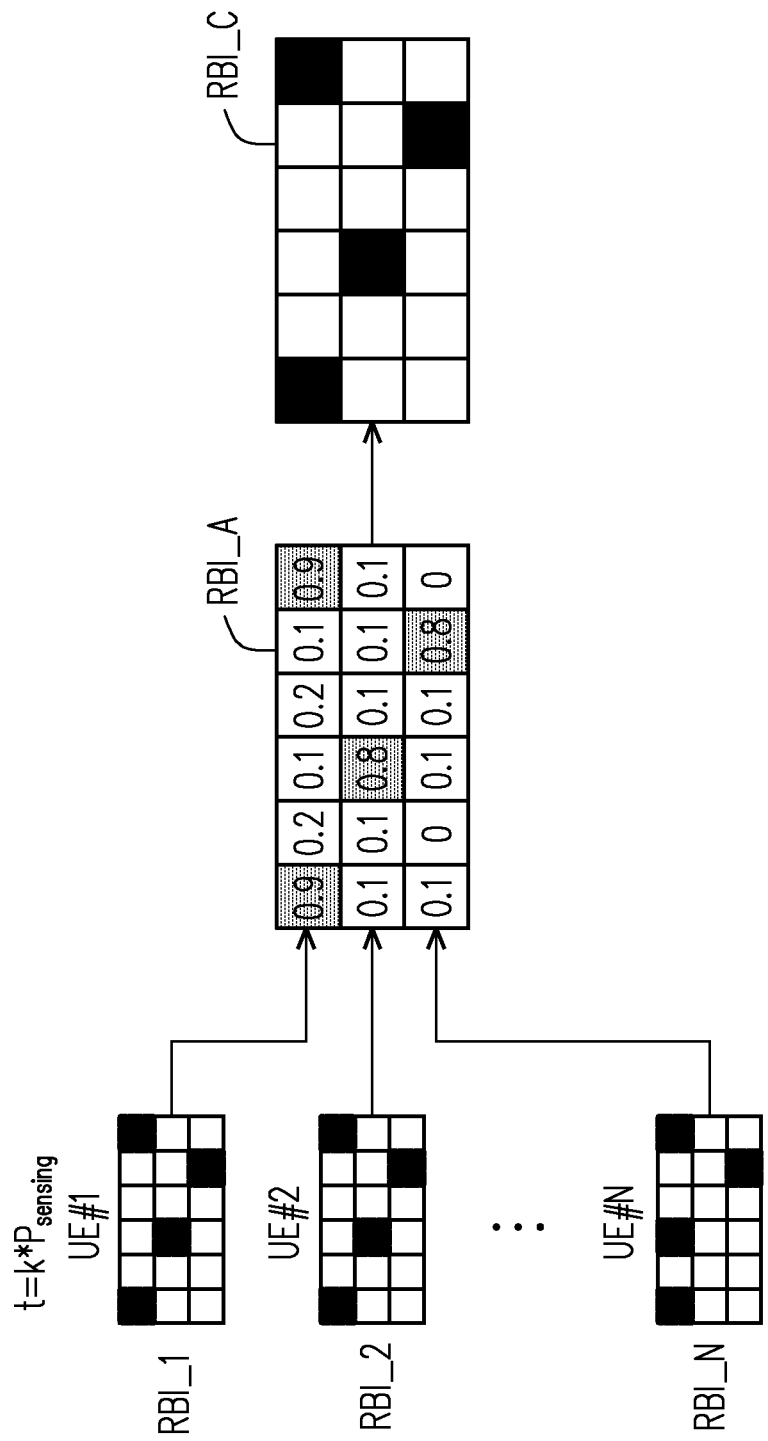
FIG. 6A and FIG. 6B illustrate an example for generating a cooperative resource indicator and an example for estimating a semi persistent scheduling period by utilizing the cooperative resource indicator according to an embodiment of the disclosure.
Figure 6B:
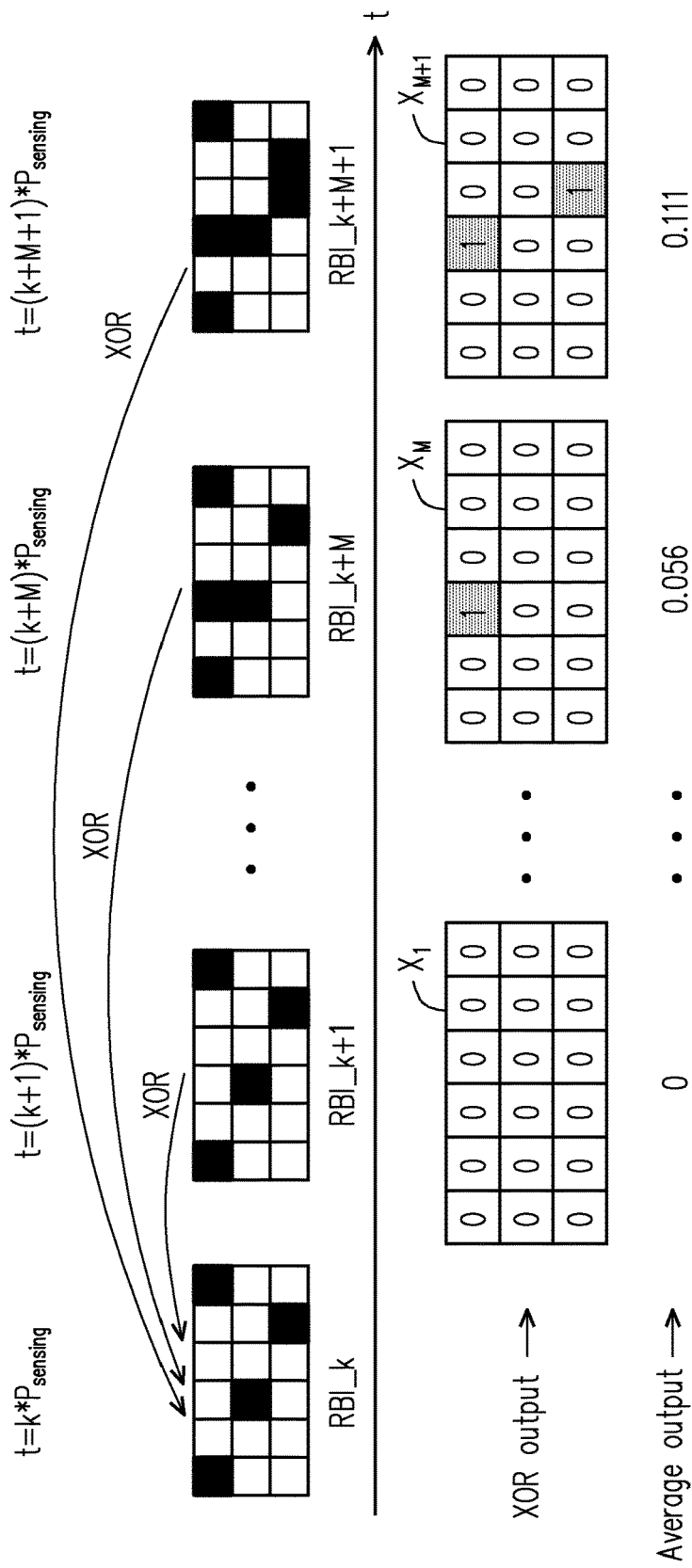

FIG. 6A and FIG. 6B illustrate an example for generating a cooperative resource indicator and an example for estimating a semi persistent scheduling period by utilizing the cooperative resource indicator according to an embodiment of the disclosure. With reference to FIG. 6A, in the present embodiment, at a time $t=k*P_{sensing}$, the UE UE#1 senses the location information of the available RBs from the shared RBs and accordingly generates the first resource indicator RBI_1. The UE UE#1 also receives the second resource indicators sent by the neighboring UEs (including the second resource indicators RBI_2 to RBI_N respectively sent by the UEs UE#2 to UE#N, where N is a positive integer). In the first resource indicator RBI_1 and the second resource indicators RBI_2 to RBI_N, blank RBs are the available RBs with a quantized value of the location being 0, and marked RBs are occupied RBs with a quantized value of the location being 1. After calculating an average of the values of RBs in the first resource indicator RBI_1 and the second resource indicators RBI_2 to RBI_N, an average resource indicator RBI_A may be obtained. At the time, a binary sequence is generated by comparing the values of the RBs in the average resource indicator RBI_A with a preset threshold (e.g., 0.75) and used as the cooperative resource indicator RBI_C, in which the RBs with the value less than the threshold are the available RBs, and the rest of the RBs are the occupied RBs. In the cooperative resource indicator RBI_C, the locations of the available RBs are labeled by 0 while the locations of the rest of the RBs are labeled by 1.

With reference to FIG. 6B, it is assumed that at times $t=k*P_{sensing}$, ..., $t=(k+M+1)*P_{sensing}$, cooperative resource indicators generated by combining the first resource indicator and the second resource indicators by the UE UE#1 are RBI_k to RBI_k+M+1, where k and M are positive integers. In this case, by using the cooperative resource indicator RBI_k as the reference cooperative resource indicator and using the reference cooperative resource indicator RBI_k to perform an exclusive-OR (XOR) operation with the other cooperative resource indicators RBI_k+1 to RBI_k+M+1, respectively, XOR outputs $X_1, \ldots, X_{M+1}$ may be obtained. Next, by calculating an average of values in the XOR outputs $X_1, \ldots, X_{M+1}$, average outputs 0, ..., 0.056 and 0.111 may be obtained. Then, the average outputs are compared with a threshold set in advance (e.g., 0.1). If the average output is less than the threshold, it can be determined that a status of the occupied RB within such time interval is a semi-persistent status. A time length $M*P_{sensing}$ between a measured time of the greatest among the average outputs within the threshold and a measured time of the reference cooperative resource indicator is used as the SPS period.

Figure 7A:
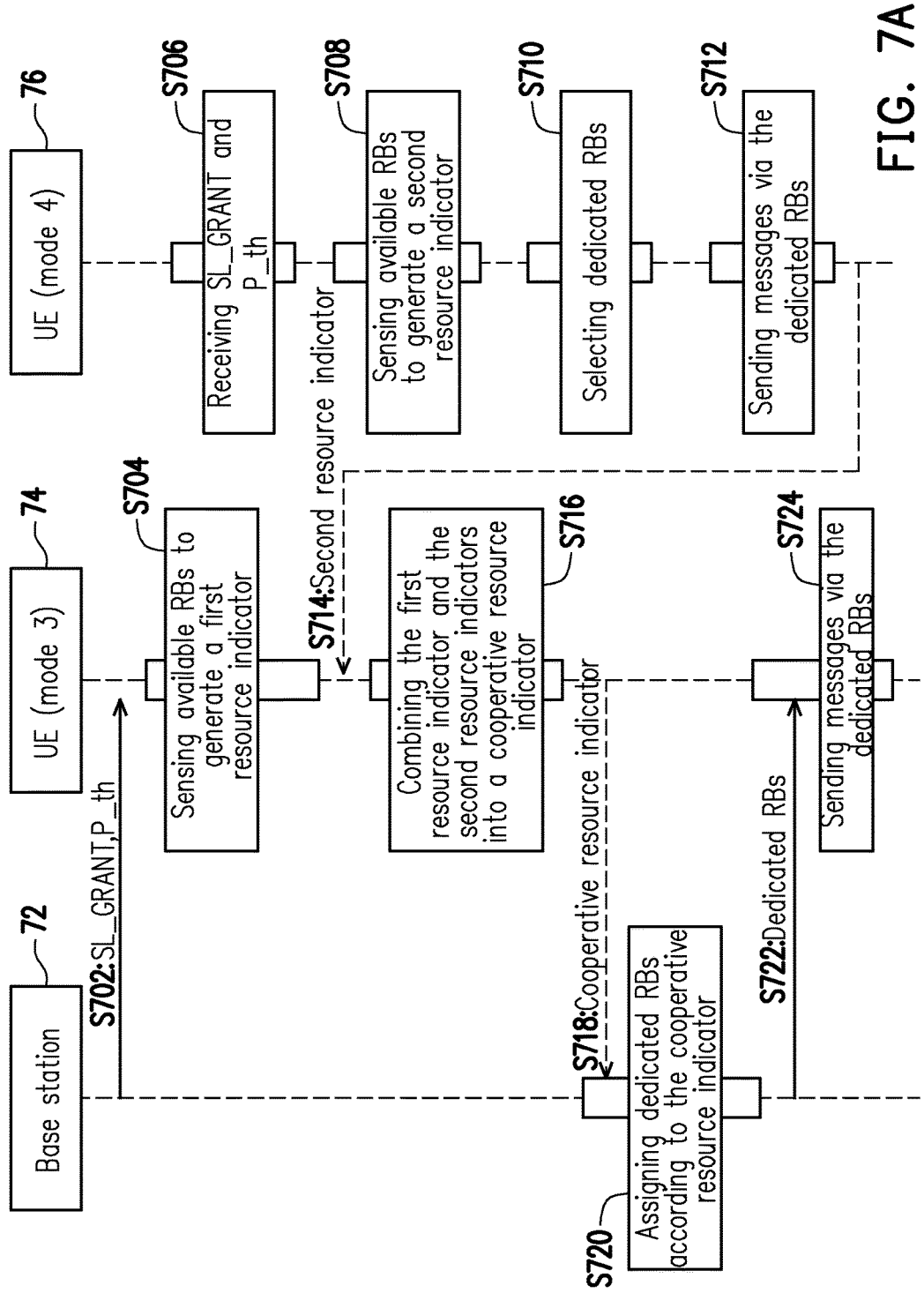
FIG. 7A and FIG. 7B are respectively a flowchart and an example illustrating a method for resource allocation of vehicle network adapted to the user equipment in mode 3 according to an embodiment of the disclosure.
Figure 7B:
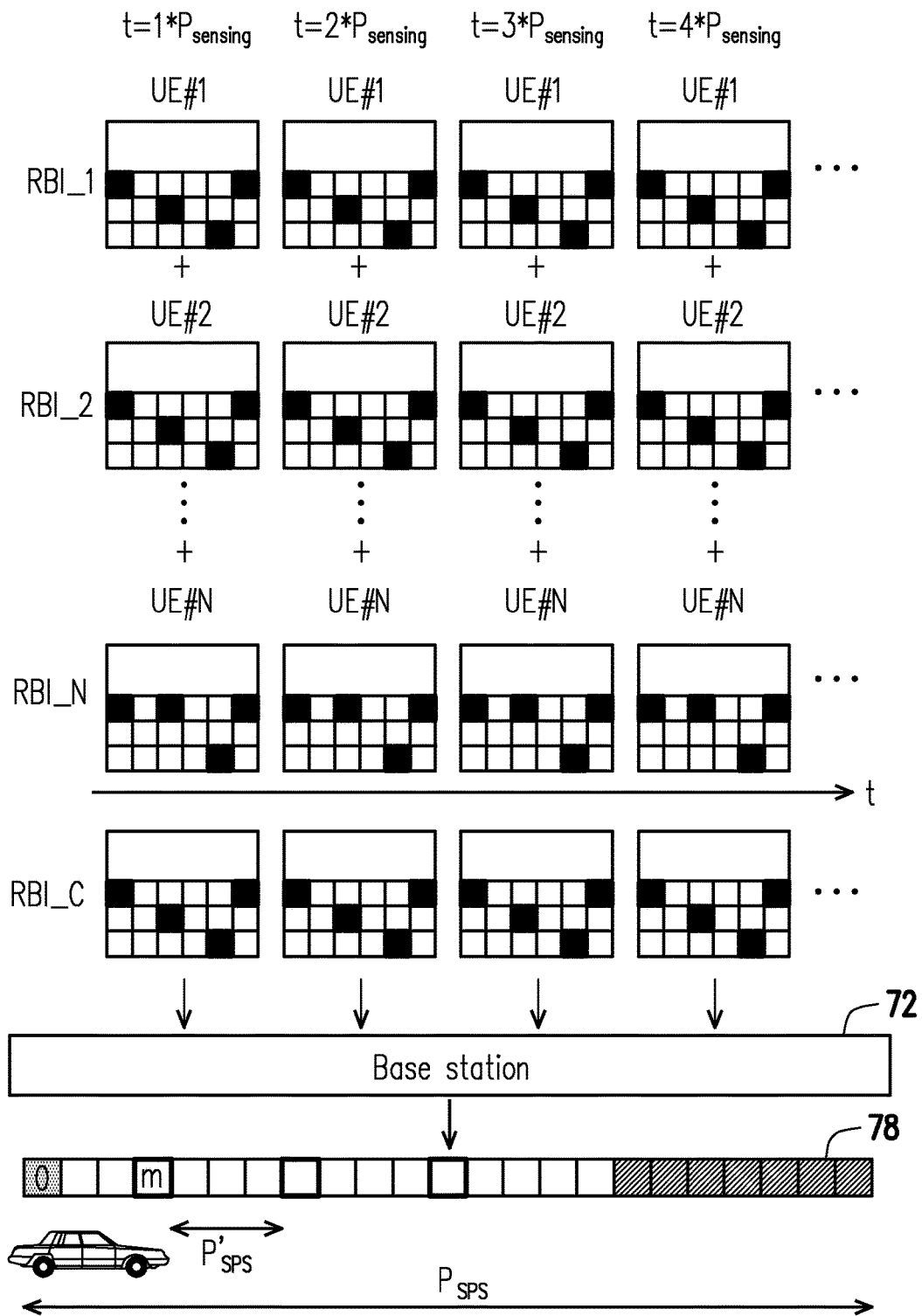

On the other hand, FIG. 7A and FIG. 7B are respectively a flowchart and an example illustrating a method for resource allocation of vehicle network adapted to the user equipment in mode 3 according to an embodiment of the disclosure. With reference to FIG. 7A, the method for resource allocation of vehicle network of the present embodiment is implemented by combining a base station 72, a UE (mode 3) 74 and neighboring UEs (mode 4) 76. Nonetheless, the neighboring UEs 76 may also be in mode 3 instead of being limited by this embodiment. In the present embodiment, the UEs in mode 3 and mode 4 are respectively configured with exclusive RBs, and yet the UEs in mode 3 may further use the exclusive RBs used by the UEs in mode 4 (e.g., the configuration shown in FIG. 2B).

In step S702, the UE 74 receives a transmission granted signaling SL_GRANT and a preset threshold P_th sent by the based station 72. In step S704, the UE 74 senses available RBs from the exclusive RBs used by the UEs in mode 4 according to the threshold P_th to generate a first resource indicator. Here, the UE 74 performs, for example, a spectrum sensing for the exclusive RBs used by the UEs in mode 4 to obtain a RSSI of each RB among the exclusive RBs and uses the RBs with the RSSI not greater than the threshold P_th as the available RBs.

In step 706, each UE 76 receives the transmission granted signaling SL_GRANT and the preset threshold P_th from a high layer. In step S708, each UE 76 senses available RBs from the exclusive RBs used by the UEs in mode 4 according to the threshold P_th to generate a second resource indicator. Here, the UE 76 performs, for example, a spectrum sensing for the exclusive RBs used by the UEs in mode 4 to obtain a RSSI of each RB among the exclusive RBs and uses the RBs with the RSSI not greater than the threshold P_th as the available RBs.

In step S710, each UE 76 selects location information of one or several dedicated RBs according to the generated second resource indicator, and in step S712, the UE 76 sends messages via the dedicated RBs.

In step S714, each UE 76 broadcasts sidelink control information (SCI) including the second resource indicator via a physical sidelink control channel (PSCCH), and the UE 74 receives the SCI broadcasted by the UEs 76 via the PSCCH and obtains the second resource indicators from the SCI.

In step S716, the UE 74 combines the first resource indicator and the second resource indicators into a cooperative resource indicator. Here, the UE 74 calculates, for example, an average, an intersection or a majority decision of binary sequence quantized values of locations of the RBs labeled in the first resource indicator and the second resource indicators to generate a binary sequence serving as the cooperative resource indicator, but the disclosure is not limited thereto. Here, the locations of the available RBs of the cooperative resource indicator may be labeled by 0 while the locations of the rest of the RBs are labeled by 1.

In step S718, the UE 74 sends the cooperative resource indicator to the base station 72 providing the centralized network via a physical uplink control channel (PUCCH).

In step S720, the base station 72 assigns one or several dedicated RBs according to the received cooperative resource indicator, and in step S722, the base station 72 sends the assigned dedicated RBs to the UE 74 via a physical downlink control channel (PDCCH).

Lastly, in step S724, according to the location information of the dedicated RBs assigned by the base station 72, the UE 74 sends messages via the dedicated RBs.

In an embodiment, with aforesaid method, the UE 74 may periodically sense the available RBs from the exclusive RBs used by the UEs in mode 4, and combine the cooperative resource indicator to be sent to the base station 72. The base station 72 may determine a specific SPS period according to a semi persistent period of the binary sequence quantized values of the locations of the RBs in the cooperative resource indicators continuously generated according to a plurality of predetermined time intervals sent by the UE 74, and instruct the UE 74 to send the messages according to information including the specific SPS period and the period and the time offset of the dedicated RBs. Here, the period of the dedicated RBs is determined by the base station according to a high layer pre-configuration value. The time offset of the dedicated RBs is determined by the base station according to the no conflict principle of the dedicated RBs of each of the UEs.

With reference to FIG. 7B, at a time $t=1*P_{sensing}$, a UE UE#1 (mode 3) senses location information of available RBs from the exclusive RBs used by the UEs in mode 4 and accordingly generates a first resource indicator RBI_1. Meanwhile, neighboring UEs UE#2 to UE#N (mode 4) of the UE UE#1 also respectively sense the location information of the available RBs from the exclusive RBs used by the UEs in mode 4 and accordingly generate second resource indicators RBI_2 to RBI_N. The UE UE#1 receives the second resource indicators RBI_2 to RBI_N from the neighboring UEs UE#2 to UE#N. combines the same with the first resource indicator RBI_1 into a cooperative resource indicator RBI_C, and sends the cooperative resource indicator RBI_C to the base station 72.

As shown in FIG. 7B, at times $t=2*P_{sensing}$, $3*P_{sensing}$ and $4*P_{sensing}$, the UEs UE#1 to UE#N continuously sense the location information of the available RBs from the exclusive RBs used by the UEs in mode 4 and accordingly generate the first resource indicator RBI_1 and the second resource indicators RBI_2 to RBI_N, and then the UE UE#1 combines the first resource indicator RBI_1 and the second resource indicators RBI_2 to RBI_N into the cooperative resource indicator RBI_C and provides the same to the base station 72. According to the semi persistent period of the binary sequence quantized values of the locations of the RBs in the cooperative resource indicators RBI_C continuously generated according to a plurality of predetermined time intervals, the base station 72 determines a SPS period Psps and sends the same to the UE UE#1. The UE UE#1 divides, for example, the SPS period $P_{SPS}$ into smaller periods $P'_{SPS}$ of the dedicated RBs such that the messages may be sent according to information including the SPS period $P_{SPS}$, the periods $P'_{SPS}$ of the dedicated RBs and a time offset m of the dedicated RBs. Taking FIG. 7B for example, if a length of the SPS period $P_{SPS}$ provided by the base station 72 (e.g., a scheduling period length 78 shown in the drawing) is 10240 ms, the UE UE#1 (e.g., a vehicle shown in the drawing) may divide such length into the smaller periods $P'_{SPS}$, and send the messages by the periods $P'_{SPS}$ starting from a time point m. In this way, bandwidth utility rate may be improved without increasing additional signaling redundancy and additional message decoding complexity.

The foregoing embodiments are provided to describe the method for resource allocation of vehicle network adapted to the UE supporting the centralized network. The following embodiments are further provided to describe a method for resource allocation of vehicle network adapted to the UE supporting the distributed network.

Figure 8:
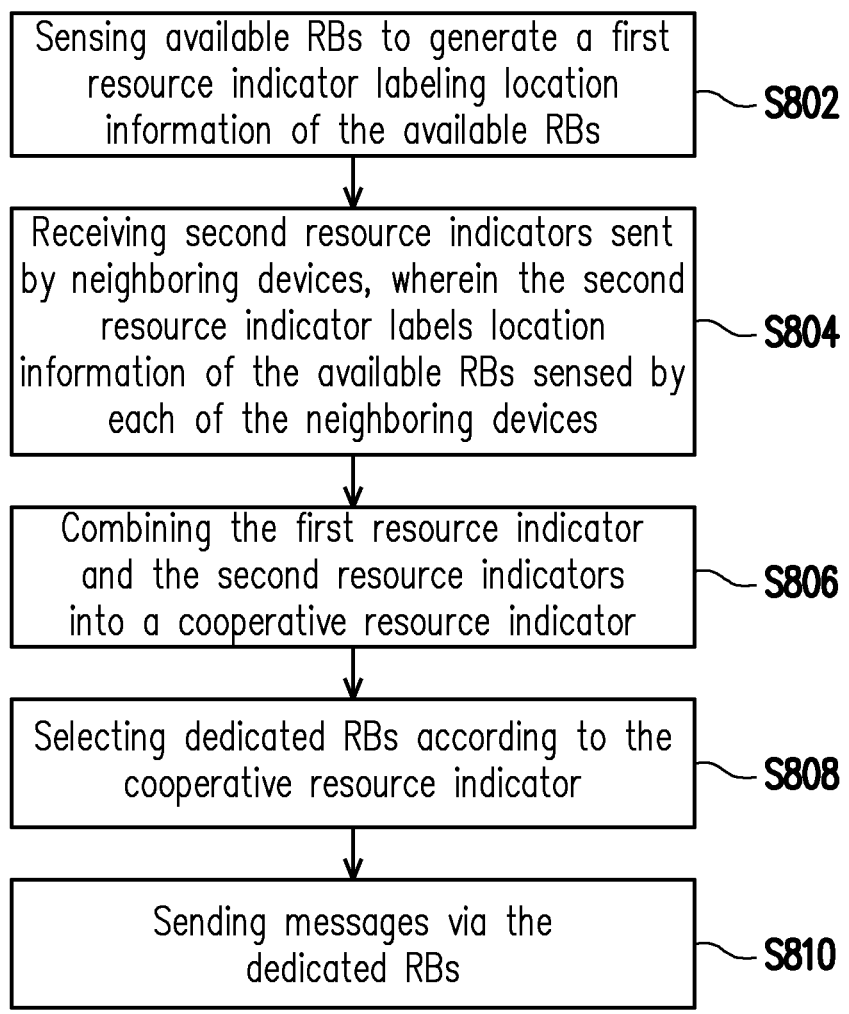
FIG. 8 is a flowchart illustrating a method for resource allocation of vehicle network according to an embodiment of the disclosure.

FIG. 8 is a flowchart illustrating a method for resource allocation of vehicle network according to an embodiment of the disclosure. Referring to FIG. 3 and FIG. 8 together, the method of the present embodiment is adapted to a UE supporting a distributed network (e.g., the UE 30 in FIG. 3), and detailed steps of the method for resource allocation of vehicle network are described below with reference to various components in the UE 30.

In step S802, the processor 36 senses available RBs from all RBs to generate a first resource indicator labeling location information of the available RBs.

In step S804, the processor 36 receives a second resource indicator sent by each of at least one neighboring device via the communication module 32. The neighboring devices are, for example, UEs in mode 3 or mode 4. In step S806, the processor 36 combines the first resource indicator and the second resource indicators into a cooperative resource indicator. Aforementioned steps S802 to S806 are identical or similar to steps S402 to S406 in the foregoing embodiment, and thus detailed content regarding the same is not repeated hereinafter.

Unlike the foregoing embodiments, the UE 30 of the present embodiment is the UE in mode 4 supporting the distributed network. In other words, the UE 30 can independently select location information of the dedicated RBs for sending messages without going through the base station. Accordingly, in step S808, the processor 36 selects location information of one or several dedicated RBs according to the cooperative resource indicator previously generated. In step S810, the processor 36 sends messages via the dedicated RBs.

In the present embodiment, the UE 30 selects the RBs according to combined sensing results of a plurality of neighboring UEs nearby (i.e., the cooperative resource indicator). In this way, it can be ensured that the selected RBs are indeed the RBs not used by the other UEs or having lower utility rate so the purpose of improving the spectrum utility rate may be achieved.

On the other hand, in an embodiment, the processor 36 further selects, for examples, a semi persistent scheduling (SPS) period by utilizing a semi persistent period of the location information of the available RBs in the generated cooperative resource indicators, and periodically sends the messages via the dedicated RBs according to information including the SPS period, a period and a time offset of the dedicated RBs. Here, the period of the dedicated RBs is determined by the UE supporting the distributed network according to a high layer pre-configuration value. The time offset of the dedicated RBs is determined by the UE supporting the distributed network according to a random principle.

In detail, the processor 36 continuously generates, for example, a plurality of cooperative resource indicators, uses one of the cooperative resource indicators (e.g., a first cooperative resource indicator) as a reference cooperative resource indicator, uses the reference cooperative resource indicator to perform a logic operation of exclusive-OR (i.e., XOR) with the other cooperative resource indicators, and compares an average of operating results with the preset threshold to estimate the SPS period.

Figure 9A:
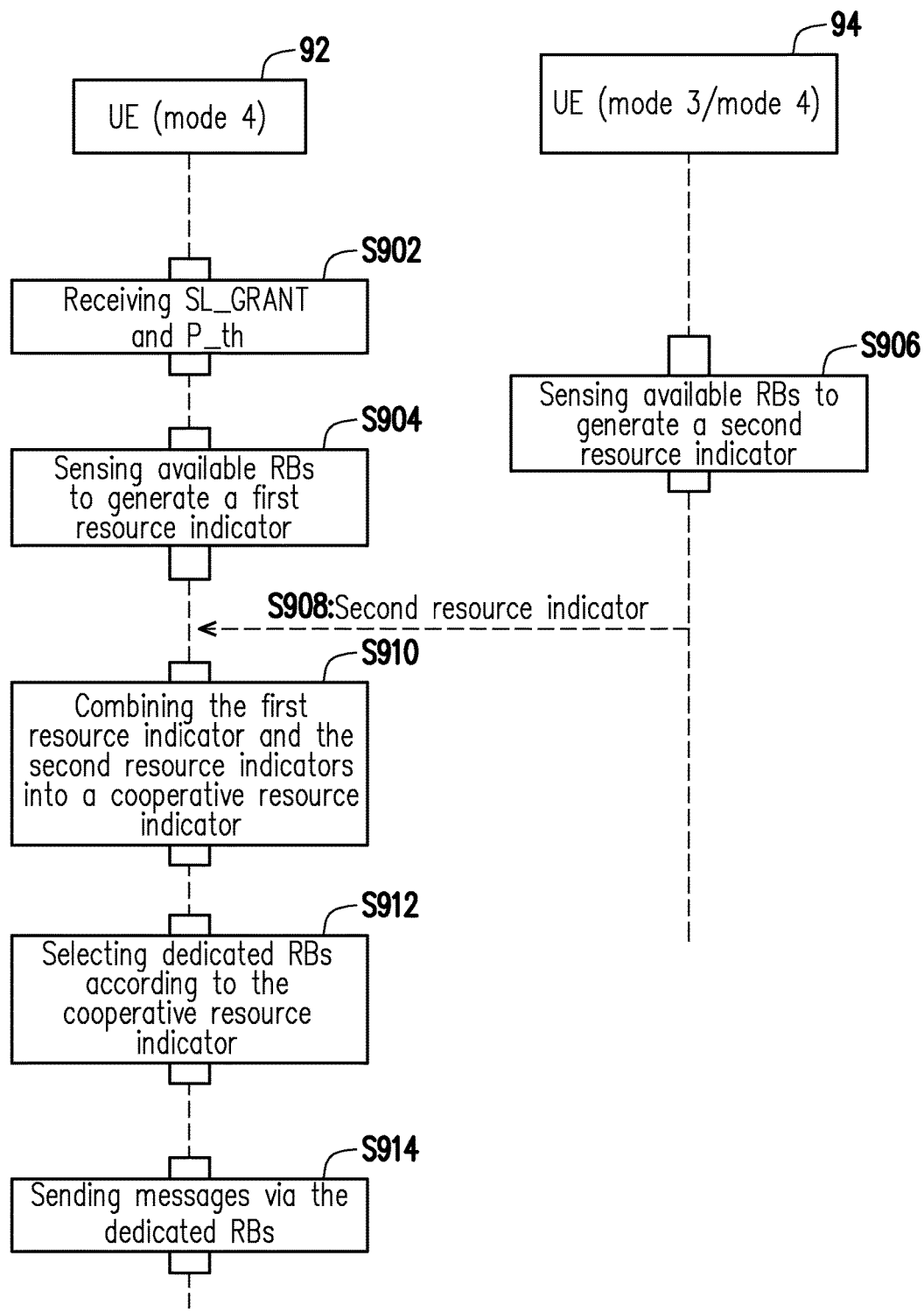
FIG. 9A and FIG. 9B are respectively a flowchart and an example illustrating a method for resource allocation of vehicle network adapted to the user equipment in mode 4 according to an embodiment of the disclosure.
Figure 9B:
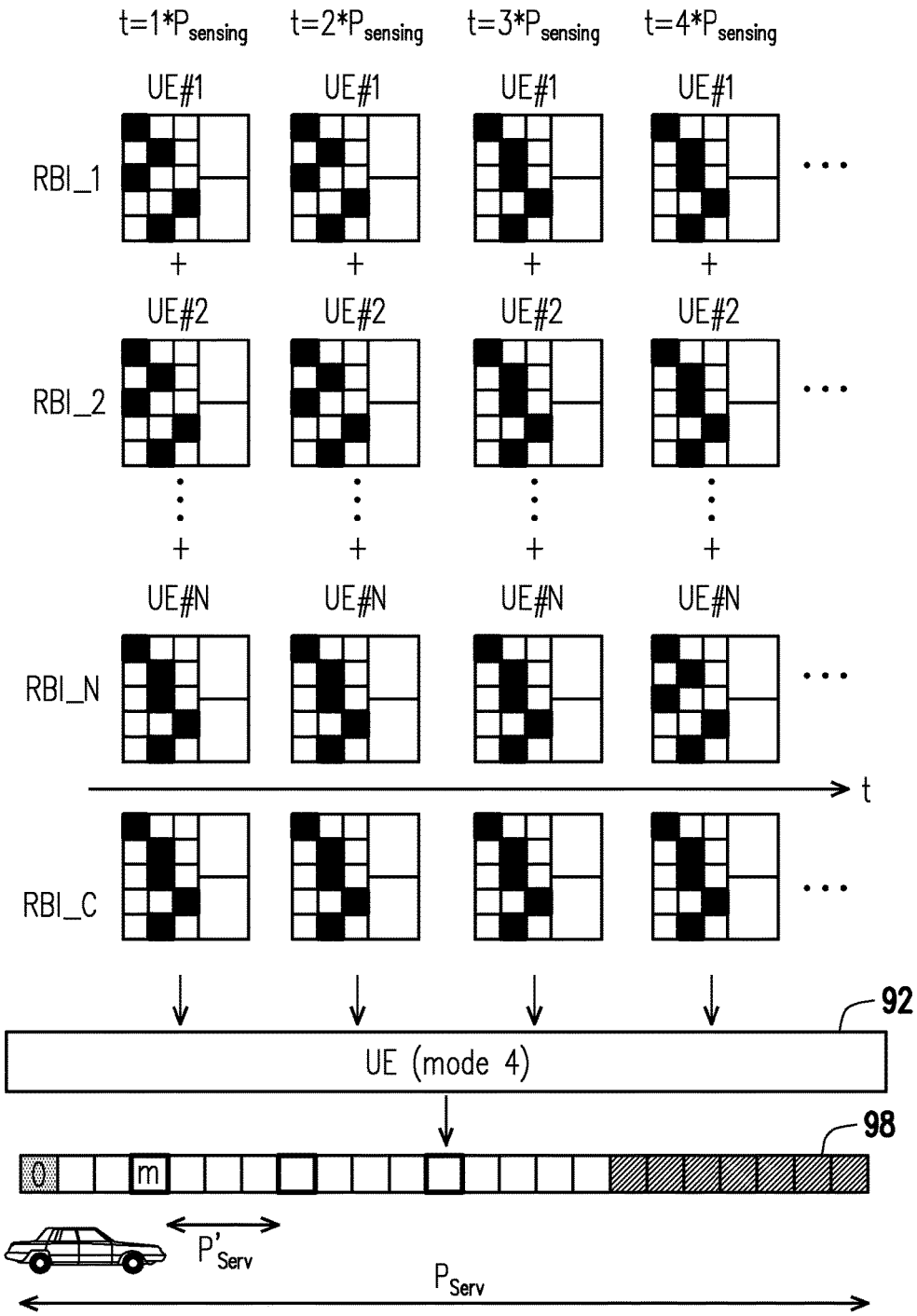

For instance, FIG. 9A and FIG. 9B are respectively a flowchart and an example illustrating a method for resource allocation of vehicle network adapted to the user equipment in mode 4 according to an embodiment of the disclosure. With reference to FIG. 9A, the method for resource allocation of vehicle network of the present embodiment is implemented by combining a UE (mode 4) 92 and neighboring UEs 94 (which may be in mode 3 or mode 4). In the present embodiment, the UEs in mode 3 and mode 4 are respectively configured with exclusive RBs, and there are shared RBs for the UEs in mode 3 and mode 4 to use (i.e., the configuration shown in FIG. 2A).

In step S902, the UE 92 receives a transmission granted signaling SL_GRANT and a preset threshold P_th from a high layer. In step S904, the UE 92 senses available RBs from the shared RBs according to the threshold P_th to generate a first resource indicator. Here, the UE 92 performs, for example, a spectrum sensing for the shared RBs to obtain a RSSI of each of the RBs in the shared RBs, and then uses the RBs with the RSSI not greater than the threshold P_th as the available RBs.

In step S906, each UE 94 senses available RBs from the shared RBs to generate a second resource indicator. Here, the UE 94 senses the location information of the available RBs by using similar method used by the UE 92 and thus details regarding the same are not repeated hereinafter.

In step S908, the UE 92 receives the second resource indicators sent by the neighboring UEs 94. Here, the UE 92 receives sidelink control information (SCI) broadcasted by the UEs 94 via a physical sidelink control channel (PSCCH), and obtains the second resource indicators from the SCI.

In step S910, the UE 92 combines the first resource indicator and the second resource indicators into a cooperative resource indicator. Here, the UE 92 calculates, for example, an average, an intersection or a majority decision of binary sequence quantized values of locations of the RBs labeled in the first resource indicator and the second resource indicators to generate a binary sequence serving as the cooperative resource indicator, but the disclosure is not limited thereto. Here, the locations of the available RBs of the cooperative resource indicator may be labeled by 0 while the locations of the rest of the RBs are labeled by 1.

In step S912, the UE 92 selects location information of one or several dedicated RBs according to the cooperative resource indicator. In step S914, the UE 92 sends messages via the dedicated RBs.

In an embodiment, with aforesaid method, the UE 92 may periodically sense the available RBs from all the RBs, determine a specific SPS period according to a semi persistent period of binary sequence quantized values of the locations of the RBs in the combined cooperative resource indicators, and send the messages according to information including the specific SPS period and the period and the time offset of the dedicated RBs. Here, the period of the dedicated RBs is determined by the UE supporting the distributed network according to a high layer pre-configuration value. The time offset of the dedicated RBs is determined by the UE supporting the distributed network according to a random principle.

With reference to FIG. 9B, at a time $t=1*P_{sensing}$, a UE UE#1 (mode 4) senses location information of available RBs from the shared RBs and accordingly generates a first resource indicator RBI_1. Meanwhile, neighboring UEs UE#2 to UE#N (mode 3/mode 4) of the UE UE#1 also respectively sense the location information of the available RBs from the shared RBs and accordingly generate second resource indicators RBI_2 to RBI_N. The UE UE#1 receives the second resource indicators RBI_2 to RBI_N from the neighboring UEs UE#2 to UE#N and combines the same with the first resource indicator RBI_1 into a cooperative resource indicator RBI_C.

As shown in FIG. 9B, at times $t=2*P_{sensing}$, $3*P_{sensing}$ and $4*P_{sensing}$, the UEs UE#1 to UE#N continuously sense the location information of the available RBs from the shared RBs and accordingly generate the first resource indicator RBI_1 and the second resource indicators RBI_2 to RBI_N, and then the UE UE#1 combines the first resource indicator RBI_1 and the second resource indicators RBI_2 to RBI_N into the cooperative resource indicator RBI_C. According to the semi persistent period of the binary sequence quantized values of the locations of the RBs in the cooperative resources indicators RBI_C continuously generated according to a plurality of predetermined time intervals, the UE UE#1 determines a SPS period $P_{Serv}$. Here, the UE UE#1 divides, for example, the SPS period $P_{Serv}$ into smaller periods $P'_{Serv}$ of the dedicated RBs such that the messages may be sent according to information including the SPS period $P_{Serv}$, the periods $P'_{Serv}$ of the dedicated RBs and a time offset m of the dedicated RBs. Taking FIG. 9B for example, if a length of the SPS period $P_{Serv}$ selected by the UE 92 (e.g., a scheduling period length 98 shown in the drawing) is 10240 ms, the UE UE#1 (e.g., a vehicle shown in the drawing) may divide such length into the smaller periods $P'_{Serv}$, and send the messages by the periods $P'_{Serv}$ starting from a time point m. In this way, bandwidth utility rate may be improved without increasing additional signaling redundancy and additional message decoding complexity.

Figure 10A:
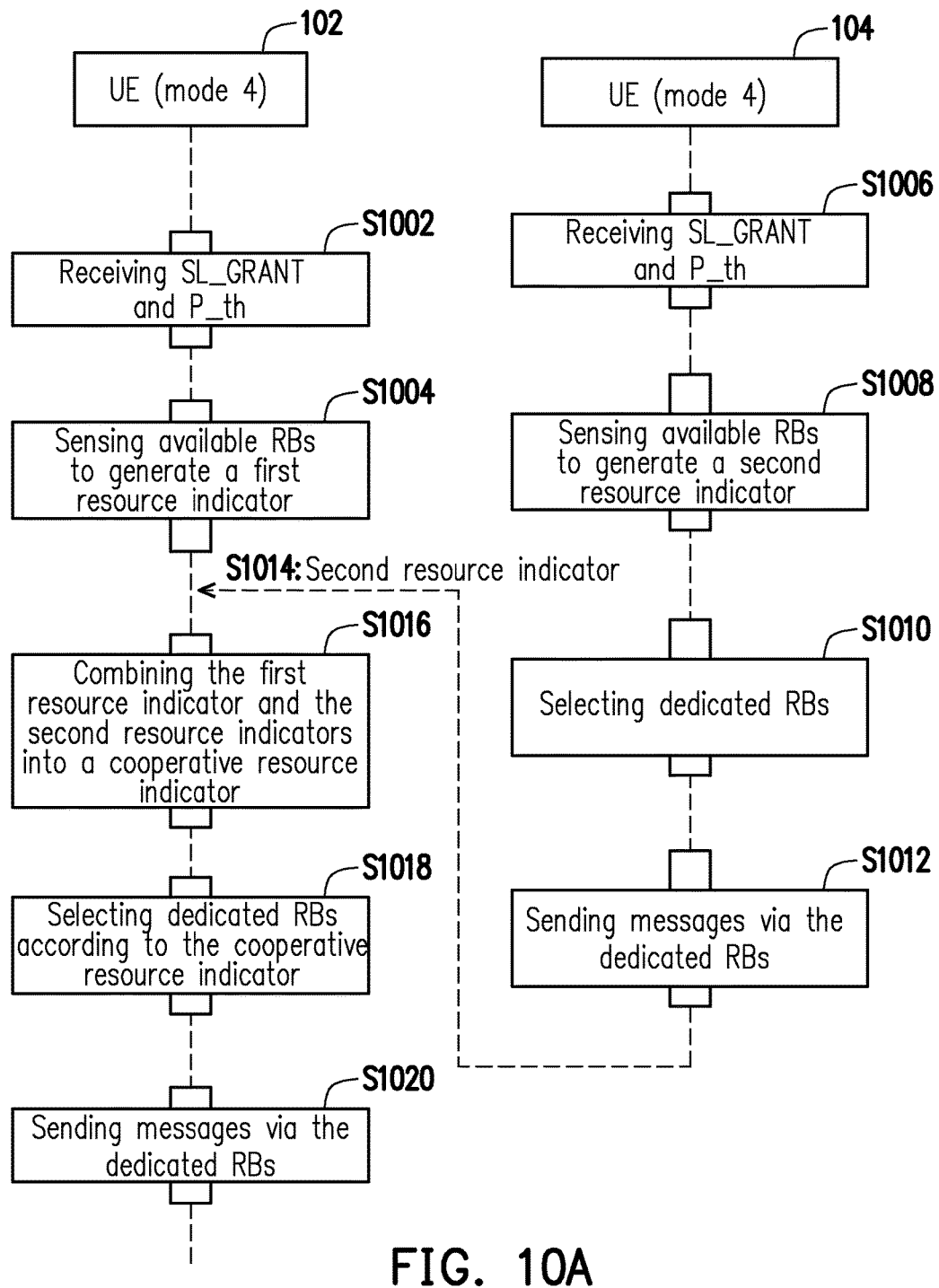
FIG. 10A and FIG. 10B are respectively a flowchart and an example illustrating a method for resource allocation of vehicle network adapted to the user equipment in mode 4 according to an embodiment of the disclosure.
Figure 10B:
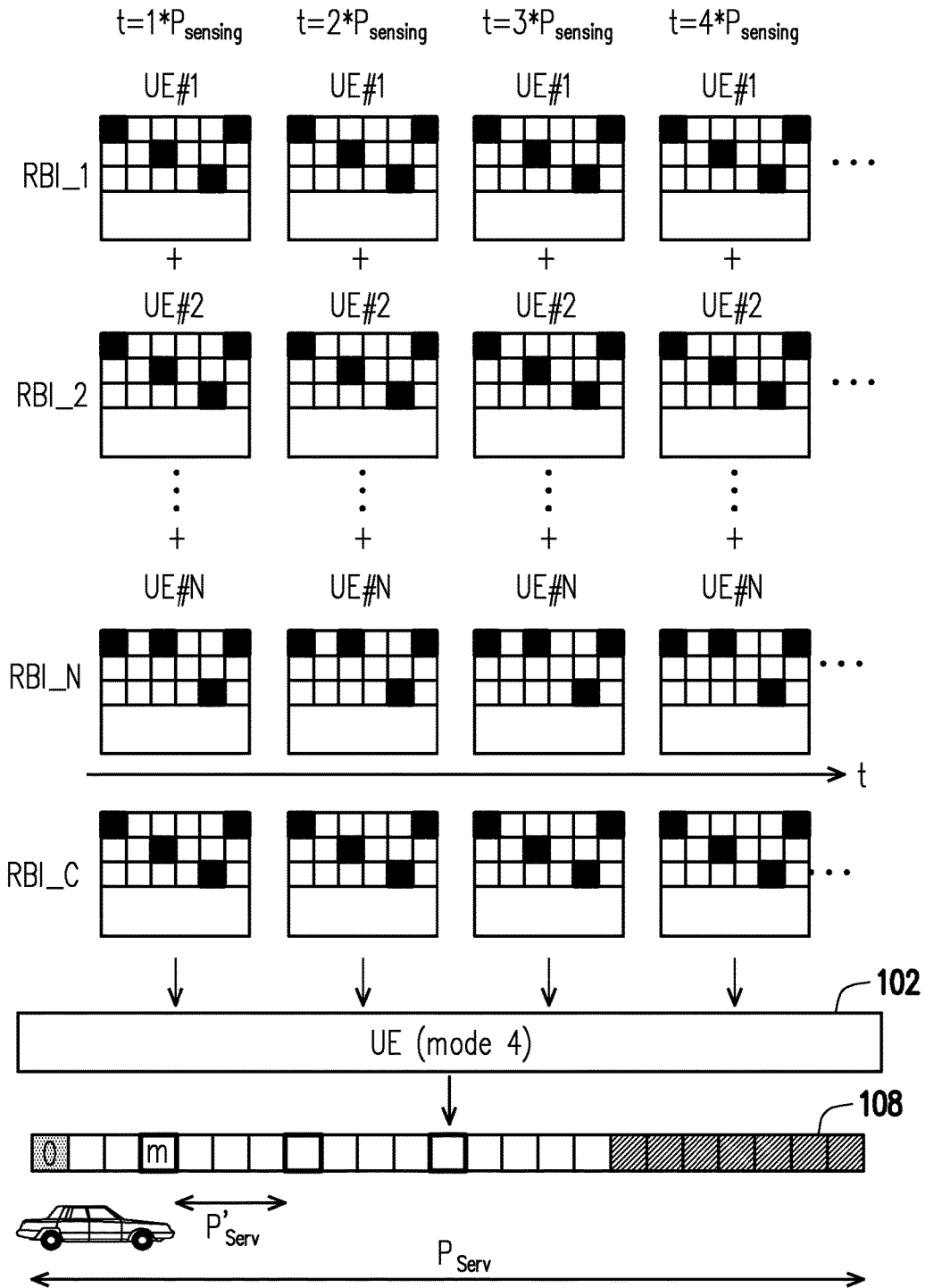

On the other hand, FIG. 10A and FIG. 10B are respectively a flowchart and an example illustrating a method for resource allocation of vehicle network adapted to the user equipment in mode 4 according to an embodiment of the disclosure. With reference to FIG. 10A, the method for resource allocation of vehicle network of the present embodiment is implemented by combining a UE (mode 4) 102 and neighboring UEs (mode 4) 104. Nonetheless, the neighboring UEs 104 may also be in mode 3 instead of being limited by this embodiment. In the present embodiment, the UEs in mode 3 and mode 4 are respectively configured with exclusive RBs, and yet the UEs in mode 4 may further use the exclusive RBs used by the UEs in mode 3 (e.g., the configuration shown in FIG. 2B).

In step S1002, the UE 102 receives a transmission granted signaling SL_GRANT and a preset threshold P_th from a high layer. In step S1004, the UE 102 senses the available RBs from the exclusive RBs used by the UEs in mode 3 according to the threshold P_th to generate a first resource indicator. Here, the UE 102 performs a spectrum sensing for the exclusive RBs used by the UEs in mode 3 to obtain a RSSI of each RB among the exclusive RBs and uses the RBs with the RSSI not greater than the threshold P_th as the available RBs.

In step S1006, each UE 104 also receives the transmission granted signaling SL_GRANT and the preset threshold P_th from the high layer. In step S1008, each UE 104 senses available RBs from the exclusive RBs used by the UEs in mode 3 according to the threshold P_th to generate a second resource indicator. Here, the UE 104 also performs a spectrum sensing for the exclusive RBs used by the UEs in mode 3 to obtain a RSSI of each RB among the exclusive RBs and uses the RBs with the RSSI not greater than the threshold P_th as the available RBs.

In step S1010, each UE 104 selects location information of one or several dedicated RBs according to the generated second resource indicator, and in step S1012, each UE 104 sends messages via the dedicated RBs.

In step S1014, each UE 104 broadcasts sidelink control information (SCI) including the second resource indicator via a physical sidelink control channel (PSCCH), and the UE 102 receives the SCI broadcasted by the UEs 104 via the PSCCH and obtains the second resource indicators from the SCI.

It should be noted that, in an embodiment, the UE 102 may also sense and detect transmission resource information in the physical sidelink control information from the neighboring UEs supporting the centralized network (i.e., the UE in mode 3) via the PSCCH. Such information is, for example, transmission time resource pattern of transmission (TRPT) information. Such information includes location information of occupied RBs in the exclusive RBs used by the UEs in mode 3. The location information of the available RBs in the exclusive RBs used by the UEs in mode 3 may be obtained according to such information, i.e., the first resource indicator may be obtained. Similarly, the UE 104 may also sense and detect transmission resource information in the physical sidelink control information from the neighboring UEs supporting the centralized network (i.e., the UE in mode 3) via the PSCCH. Such information is, for example, a transmission time resource pattern, and the second resource indicator may be obtained according to such information.

In step S1016, the UE 102 combines the first resource indicator and the second resource indicators into a cooperative resource indicator. Here, the UE 102 calculates, for example, an average, an intersection or a majority decision of binary sequence quantized values of locations of the RBs labeled in the first resource indicator and the second resource indicators to generate a binary sequence serving as the cooperative resource indicator, but the disclosure is not limited thereto. Here, the locations of the available RBs may be labeled by 0 while the locations of the rest of the RBs are labeled by 1.

In step S1018, the UE 102 selects location information of one or several dedicated RBs according to the cooperative resource indicator. In step S1020 the UE 102 sends messages via the dedicated RBs.

In an embodiment, with aforesaid method, the UE 102 may periodically sense the location information of the available RBs in the exclusive RBs used by the UEs in mode 3, determine a specific SPS period according to a semi persistent period of binary sequence quantized values of the locations of the RBs in the cooperative resource indicators continuously generated according to a plurality of preset time intervals, and send the messages according to information including the specific SPS period and the period and the time offset of the dedicated RBs. Here, the period of the dedicated RBs is determined by the UE supporting the distributed network according to a high layer pre-configuration value. The time offset of the dedicated RBs is determined by the UE supporting the distributed network according to a random principle.

With reference to FIG. 10B, at a time $t=1*P_{sensing}$, a UE UE#1 (mode 4) senses location information of available RBs from the exclusive RBs used by the UEs in mode 3 and accordingly generates a first resource indicator RBI_1. Meanwhile, neighboring UEs UE#2 to UE#N (mode 4) of the UE UE#1 also respectively sense the location information of the available RBs from the exclusive RBs used by the UEs in mode 3 and accordingly generate second resource indicators RBI_2 to RBI_N. The UE UE#1 receives the second resource indicators RBI_2 to RBI_N from the neighboring UEs UE#2 to UE#N and combines the same with the first resource indicator RBI_1 into a cooperative resource indicator RBI_C.

As shown in FIG. 10B, at times $t=2*P_{sensing}$, $3*P_{sensing}$ and $4*P_{sensing}$, the UEs UE#1 to UE#N continuously sense the location information of the available RBs from the exclusive RBs used by the UEs in mode 3 and accordingly generate the first resource indicator RBI_1 and the second resource indicators RBI_2 to RBI_N, and then the UE UE#1 combines the first resource indicator RBI_1 and the second resource indicators RBI_2 to RBI_N into the cooperative resource indicator RBI_C. According to the semi persistent period of the binary sequence quantized values of the locations of the RBs in the cooperative resources indicators RBI_C continuously generated according to a plurality of predetermined time intervals, the UE UE#1 determines a SPS period $P_{Serv}$. Here, the UE UE#1 divides, for example, the SPS period $P_{Serv}$ into smaller periods $P'_{Serv}$ of the dedicated RBs such that the messages may be sent according to information including the SPS period $P_{Serv}$, the periods $P'_{Serv}$ of the dedicated RBs and a time offset m of the dedicated RBs. Taking FIG. 10B for example, if a length of the SPS period $P_{Serv}$ selected by UE 102 (e.g., a scheduling period length 108 shown in the drawing) is 10240 ms, the UE UE#1 (e.g., a vehicle shown in the drawing) may divide such length into the smaller periods $P'_{Serv}$ and send the messages by the periods $P'_{Serv}$ starting from a time point m. In this way, bandwidth utility rate may be improved without increasing additional signaling redundancy and additional message decoding complexity.

In view of the above content, with the method and the UE for resource allocation of vehicle network of the disclosure, the location information of the available RBs may be recorded by utilizing resource labels and combined with resource labels provided by the neighboring UEs for the base station or the UE to use in estimation of the location information of the available RBs and assignment of the available RBs. As a result, the purpose of sharing RBs and improving the spectrum utility rate may be achieved.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A method for resource allocation of a vehicle network, adapted to a user equipment (UE) supporting a centralized network, the method comprising:
    sensing available resource blocks (RBs) to generate a first resource indicator labeling location information of the available RBs;
    receiving a second resource indicator sent by each of at least one neighboring device, wherein the second resource indicator labels location information of available RBs sensed by each of the at least one neighboring device;
    combining the first resource indicator and the second resource indicators into a cooperative resource indicator;
    sending the cooperative resource indicator to a base station serving the centralized network and receiving location information of a dedicated RB assigned by the base station according to the cooperative resource indicator; and
    sending messages via the dedicated RB.

2. The method according to claim 1, wherein the available RBs are sensed from exclusive RBs provided for a UE supporting a distributed network to use or from shared RBs.

3. The method according to claim 1, wherein the step of sensing the available RBs comprises:
    periodically performing a spectrum sensing for all the RBs according to a predetermined time interval to obtain a received signal strength indicator (RSSI) of each of the RBs;
    determining whether the RSSI of each of the RBs is greater than a threshold; and
    selecting the RBs with the RSSI not greater than the threshold as the available RBs.

4. The method according to claim 1, wherein the step of generating the first resource indicator labeling the location information of the available RBs comprises:
    quantizing signal energy of all the RBs according to the sensed location information of the available RBs to generate a binary sequence serving as the first resource indicator.

5. The method according to claim 1, wherein the at least one neighboring device comprises at least one UE supporting the centralized network or at least one UE supporting a distributed network, and the second resource indicator is obtained from sidelink control information (SCI) broadcasted via a physical sidelink control channel (PSCCH) by the at least one neighboring device.

6. The method according to claim 1, wherein the step of combining the first resource indicator and the second resource indicators into the cooperative resource indicator comprises:
    calculating an average, an intersection or a majority decision of the location information of each of the RBs labeled in the first resource indicator and the second resource indicators to generate a binary sequence serving as the cooperative resource indicator.

7. The method according to claim 1, wherein the step of receiving the location information of the dedicated RB assigned by the base station according to the cooperative resource indicator and sending the messages via the dedicated RB further comprises:
    receiving a semi persistent scheduling (SPS) period assigned by the base station and a period and a time offset of the dedicated RB, and periodically sending the messages via the dedicated RB within the SPS period, wherein the SPS period is determined by the base station according to a semi persistent period of the location information of the available RBs in the received cooperative resource indicator.

8. A user equipment (UE) supporting a centralized network, comprising:
    a communication device, communicating with a base station and UEs;
    a storage device, storing a plurality of commands; and
    a processor, coupled to the communication device and the storage device, and configured to load and execute the commands stored in the storage device for:
        sensing available resource blocks (RBs) to generate a first resource indicator labeling location information of the available RBs;
        receiving a second resource indicator sent by each of at least one neighboring device by utilizing the communication device, wherein the second resource indicator labels location information of available RBs sensed by each of the at least one neighboring device;
        combining the first resource indicator and the second resource indicators into a cooperative resource indicator;
        sending the cooperative resource indicator to a base station serving the centralized network and receiving location information of a dedicated RB assigned by the base station according to the cooperative resource indicator by utilizing the communication device;
        sending messages via the dedicated RB by utilizing the communication device.

9. The user equipment according to claim 8, wherein the processor further executes the commands for sensing the available RBs from exclusive RBs provided for a UE supporting a distributed network to use or from shared RBs.

10. The user equipment according to claim 8, wherein the processor periodically performs a spectrum sensing for all the RBs according to a predetermined time interval to obtain a received signal strength indicator (RSSI) of each of the RBs, determines whether the RSSI of each of the RBs is greater than a threshold, and selects the RBs with the RSSI not greater than the threshold as the available RBs.

11. The user equipment according to claim 8, wherein the processor quantizes signal energy of all the RBs according to the sensed location information of the available RBs to generate a binary sequence serving as the first resource indicator.

12. The user equipment according to claim 8, wherein the at least one neighboring device comprises at least one UE supporting the centralized network or at least one UE supporting a distributed network, and the second resource indicator is obtained by the processor utilizing the communication device from sidelink control information (SCI) broadcasted via a physical sidelink control channel (PSCCH) by the at least one neighboring device.

13. The user equipment according to claim 8, wherein the processor calculates an average, an intersection or a majority decision of the location information of each of the RBs labeled in the first resource indicator and the second resource indicators to generate a binary sequence serving as the cooperative resource indicator.

14. The user equipment according to claim 8, wherein the processor further receives a semi persistent scheduling (SPS) period assigned by the base station and a period and a time offset of the dedicated RB, and periodically sends the messages via the dedicated RB within the SPS period by utilizing the communication device, wherein the SPS period is determined by the base station according to a semi persistent period of the location information of the available RBs in the received cooperative resource indicator.

15. A method for resource allocation of vehicle network, adapted to a user equipment (UE) supporting a distributed network, the method comprising:
sensing available resource blocks (RBs) to generate a first resource indicator labeling location information of the available RBs;
receiving a second resource indicator sent by each of at least one neighboring device, wherein the second resource indicator labels location information of available RBs sensed by each of the at least one neighboring device;
combining the first resource indicator and the second resource indicators into a cooperative resource indicator; and
selecting location information of a dedicated RB according to the cooperative resource indicator and sending messages via the dedicated RB.

16. The method according to claim 15, wherein the available RBs are sensed from exclusive RBs provided for a UE supporting a centralized network to use or from shared RBs.

17. The method according to claim 15, wherein the step of sensing the available RBs comprises:
periodically performing a spectrum sensing for all the RBs according to a predetermined time interval to obtain a received signal strength indicator (RSSI) of each of the RBs;
determining whether the RSSI of each of the RBs is greater than a threshold; and
selecting the RBs with the RSSI not greater than the threshold as the available RBs.

18. The method according to claim 15, wherein the available RBs are sensed from exclusive RBs provided for a UE supporting a centralized network to use, and the method further comprises:
periodically sensing transmission resource information in sidelink control information (SCI) broadcasted by a physical sidelink control channel (PSCCH) according to a predetermined time interval to obtain the location information of the available RBs of the UE supporting the centralized network.

19. The method according to claim 15, wherein the step of generating the first resource indicator labeling the location information of the available RBs comprises:
quantizing signal energy of all the RBs according to the sensed location information of the available RBs to generate a binary sequence serving as the first resource indicator.

20. The method according to claim 15, wherein the at least one neighboring device comprises at least one UE supporting the distributed network or at least one UE supporting a centralized network, and the second resource indicator is obtained from sidelink control information (SCI) broadcasted via a physical sidelink control channel (PSCCH) by the at least one neighboring device.

21. The method according to claim 15, wherein the step of combining the first resource indicator and the second resource indicators into the cooperative resource indicator comprises:
calculating an average, an intersection or a majority decision of the location information of each of the RBs labeled in the first resource indicator and the second resource indicators to generate a binary sequence serving as the cooperative resource indicator.

22. The method according to claim 15, wherein the step of selecting the location information of the dedicated RB according to the cooperative resource indicator and sending the messages via the dedicated RB further comprises:
according to a semi persistent scheduling (SPS) period and a period and a time offset of the dedicated RB, periodically sending the messages via the dedicated RB within the SPS period, wherein the SPS period is determined according to a semi persistent period of the location information of the available RBs in the cooperative resource indicator.

23. A user equipment (UE) supporting a distributed network, comprising:
a communication device, communicating with UEs;
a storage device, storing a plurality of commands; and
a processor, coupled to the communication device and the storage device, and configured to load and execute the commands stored in the storage device for:
sensing available resource blocks (RBs) to generate a first resource indicator labeling location information of the available RBs;
receiving a second resource indicator sent by each of at least one neighboring device via the communication device, wherein the second resource indicator labels location information of available RBs sensed by each of the at least one neighboring device;
combining the first resource indicator and the second resource indicators into a cooperative resource indicator; and
selecting location information of a dedicated RB according to the cooperative resource indicator to drive the communication device to send messages via the dedicated RB.

24. The user equipment according to claim 23, wherein the processor senses the available RBs from exclusive RBs provided for a UE supporting a centralized network to use or from shared RBs.

25. The user equipment according to claim 23, wherein the processor periodically performs a spectrum sensing for all the RBs according to a predetermined time interval to obtain a received signal strength indicator (RSSI) of each of the RBs, determines whether the RSSI of each of the RBs is greater than a threshold, and selects the RBs with the RSSI not greater than the threshold as the available RBs.

26. The user equipment according to claim 23, wherein the processor senses the available RBs from exclusive RBs provided for a UE supporting a centralized network to use, and the processor further periodically senses transmission resource information in sidelink control information (SCI) broadcasted by a physical sidelink control channel (PSCCH) according to a predetermined time interval to obtain the location information of the available RBs of the UE supporting the centralized network.

27. The user equipment according to claim 23, wherein the processor quantizes signal energy of all the RBs according to the sensed location information of the available RBs to generate a binary sequence serving as the first resource indicator.

28. The user equipment according to claim 23, wherein the at least one neighboring device comprises at least one UE supporting the distributed network or at least one UE supporting a centralized network, and the second resource indicator is obtained from sidelink control information (SCI) broadcasted via a physical sidelink control channel (PSCCH) by the at least one neighboring device.

29. The user equipment according to claim 23, wherein the processor calculates an average, an intersection or a majority decision of the location information of each of the RBs labeled in the first resource indicator and the second resource indicators to generate a binary sequence serving as the cooperative resource indicator.

30. The user equipment according to claim 23, wherein according to a semi persistent scheduling (SPS) period and a period and a time offset of the dedicated RB, the processor further periodically sends the messages via the dedicated RB within the SPS period, wherein the SPS period is determined according to a semi persistent period of the location information of the available RBs in the cooperative resource indicator.

31. The method according to claim 1, further comprising:
   receiving a transmission granted signaling sent by the base station.

32. The user equipment according to claim 8, wherein the processor further comprises receiving a transmission granted signaling sent by the base station.

* * * * *